United States Patent
Bernhard et al.

(10) Patent No.: US 7,969,238 B2
(45) Date of Patent: Jun. 28, 2011

(54) ACTIVE FILTER HAVING A MULTILEVEL TOPOLOGY

(75) Inventors: Tobias Bernhard, Hirschaid (DE); Mike Dommaschk, Guteborn (DE); Jörg Dorn, Buttenheim (DE); Ingo Euler, Erlangen (DE); Franz Karlecik-Maier, Höchstadt (DE); Jörg Lang, Stadtsteinach (DE); John-William Strauss, Röttenbach (DE); Quoc-Buu Tu, Rosstal (DE); Carsten Wittstock, Nürnberg (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/595,283

(22) PCT Filed: Apr. 2, 2008

(86) PCT No.: PCT/EP2008/053922
§ 371 (c)(1),
(2), (4) Date: Oct. 9, 2009

(87) PCT Pub. No.: WO2008/125493
PCT Pub. Date: Oct. 23, 2008

(65) Prior Publication Data
US 2010/0127769 A1 May 27, 2010

(30) Foreign Application Priority Data
Apr. 16, 2007 (DE) .......................... 10 2007 018 343

(51) Int. Cl.
*H03B 1/00* (2006.01)

(52) U.S. Cl. .......................... 327/552; 327/581; 327/588
(58) Field of Classification Search .................. 323/207; 327/551, 552, 553, 581, 588
See application file for complete search history.

(56) References Cited

U.S. PATENT DOCUMENTS

| | | | | |
|---|---|---|---|---|
| 5,642,275 A * | 6/1997 | Peng et al. | ..................... | 363/137 |
| 5,648,894 A * | 7/1997 | DeDoncker et al. | ............ | 363/39 |
| 5,751,138 A * | 5/1998 | Venkata et al. | ............... | 323/207 |
| 6,005,788 A * | 12/1999 | Lipo et al. | ........................ | 363/71 |
| 6,075,350 A * | 6/2000 | Peng | ............................. | 323/207 |
| 7,638,983 B2 * | 12/2009 | Park et al. | ........................ | 322/20 |
| 7,710,082 B2 * | 5/2010 | Escobar Valderrama et al. | .............................. | 323/207 |
| 2005/0281067 A1 | 12/2005 | Deng et al. | | |

FOREIGN PATENT DOCUMENTS
DE        10103031 A1    7/2002

* cited by examiner

*Primary Examiner* — Jeffrey S Zweizig
(74) *Attorney, Agent, or Firm* — Laurence A. Greenberg; Werner H. Stemer; Ralph E. Locher

(57) ABSTRACT

A cost-effective device for influencing the transmission of electrical energy of an alternating voltage line with a plurality of phases has phase modules, which each have an alternating voltage terminal for connecting to a phase of the alternating voltage line and two connecting terminals. A phase module branch extends between each connecting terminal and each alternating voltage terminal. The phase module branch is formed of a series connection of sub-modules, each having a power semiconductor circuit and an energy accumulator connected in parallel to the power semiconductor circuit. The connecting terminals are connected to one another. The power semiconductor circuit is equipped with power semiconductors that can be switched off and are connected to each other in a half bridge.

5 Claims, 3 Drawing Sheets

ACTIVE FILTER HAVING A MULTILEVEL TOPOLOGY

BACKGROUND OF THE INVENTION

Field of the Invention

The invention relates to a device for influencing the electrical energy transmission of an AC voltage line having a plurality of phases with phase modules, which each have an AC voltage terminal for connection to a respective phase of the AC voltage line and two connecting terminals, wherein a phase module branch extends between each connecting terminal and each AC voltage terminal, said phase module branch comprising a series circuit formed by submodules each having a power semiconductor circuit and an energy store connected in parallel with the power semiconductor circuit, and wherein the connecting terminals are connected to one another.

Such a device is already known from U.S. Pat. No. 6,075,350, which describes a so-called multilevel converter that is provided for filtering harmonics of the power supply frequency of an AC voltage line and for power factor correction. The previously known converter has a phase module for each phase of the AC voltage power supply, said phase module having an AC voltage terminal, by means of which each phase module is connected to a respective phase of the AC voltage line. In this case, each phase module has a series circuit comprising submodules configured as two-terminal networks, wherein each submodule has a capacitor and, connected in parallel with the capacitor, a full-bridge circuit comprising power semiconductors. Each of these turn-off power semiconductors has a freewheeling diode connected in parallel with it in the opposite sense. Examples of appropriate turn-off power semiconductors include IGBTs, GTOs or the like. With the aid of the full-bridge circuit, given expedient driving of the turn-off power semiconductors, it is possible to impress the capacitor voltage, a zero voltage or else the inverted capacitor voltage on the terminals of each submodule. At their end remote from the AC voltage terminal, the phase modules are interconnected with one another to form a star. By turning submodules on and off with the aid of the power semiconductor circuit, it is possible to approximate a sinusoidal voltage in stepped fashion. In this case, the full-bridge circuit permits the greatest possible flexibility in the circuit. However, the full-bridge circuit necessitates a multiplicity of power semiconductor modules, whereby the costs of such a device are increased.

BRIEF SUMMARY OF THE INVENTION

It is an object of the invention, therefore, to provide a device of the type mentioned in the introduction which is cost-effective.

The invention achieves this object by virtue of the fact that the power semiconductor circuit has turn-off power semiconductors interconnected with one another in a half-bridge.

The invention provides an active filter having a multilevel topology. In other words, a phase module is provided for each phase or alternatively, in the case of an application of the active filter in a DC voltage intermediate circuit, for each pole, said phase module comprising a series circuit formed by submodules. The submodules are bipolar networks and have two connection terminals. In this case, each submodule has an energy store, for example a capacitor, with which a power semiconductor circuit is connected in parallel. Depending on the driving of the power semiconductors of the power semiconductor circuit, the voltage dropped across the energy store can be produced at the connection terminals, or else a zero voltage. In contrast to the multilevel active filter in accordance with the prior art, a half-bridge circuit is provided according to the invention. Such topologies have previously been disclosed only in connection with high voltage direct current transmission. The use of a full-bridge circuit in connection with high voltage direct current transmission fails since energy cannot be fed into a DC voltage intermediate circuit on account of a full-bridge circuit. The invention is based on the concept that an interconnection of power semiconductors that is only known from energy transmission can also be used for an active filter. The suppression of harmonics in an AC voltage power supply or in a DC voltage intermediate circuit is also possible according to the invention by means of a half-bridge circuit which, in contrast to the prior art, cannot generate an inverted energy store voltage at its connection terminals. The major advantage of the half-bridge circuit over the full-bridge circuit can be seen in the costs, since, on account of the half-bridge circuit, only half as many power semiconductor modules have to be used in the active filter.

In a first expedient configuration of the half-bridge circuit, each submodule has a first connection terminal, a second connection terminal, an energy store and a power semiconductor branch connected in parallel with the energy store, said power semiconductor branch having two turn-off power semiconductors connected in series, wherein a freewheeling diode that is connected in the opposite sense is connected in parallel with each turn-off power semiconductor and the junction point of the emitter of a first turn-off power semiconductor of the power semiconductor branch and the anode of the freewheeling diode that is connected in the opposite sense and is assigned to the first turn-off power semiconductor forms the first connection terminal and the junction point of the turn-off power semiconductor of the power semiconductor branch and the freewheeling diodes forms the second connection terminal.

In a configuration that deviates therefrom, each submodule has a first connection terminal, and a second connection terminal, wherein the power semiconductor circuit has a power semiconductor branch connected in parallel with the energy store, said power semiconductor branch having two turn-off power semiconductors connected in series, wherein a diode that is connected in the opposite sense is connected in parallel with each turn-off power semiconductor and the junction point of the collector of the first turn-off power semiconductor of the power semiconductor branch and the cathode of the freewheeling diode that is connected in the opposite sense and is assigned to the first turn-off power semiconductor forms the first connection terminal and the junction point of the turn-off power semiconductors of the power semiconductor branch and the freewheeling diode forms the second connection terminal.

In accordance with one expedient further development of the invention, a further phase module is provided, which has a grounding terminal connected to ground potential and two connecting terminals, wherein a respective phase module branch extends between each connecting terminal and the grounding terminal, said phase module branch comprising a series circuit formed by submodules, wherein each connecting terminal is connected to the connecting terminal of the remaining phase modules. In accordance with this advantageous further development, not only is damping of the negative phase sequence system provided, rather the grounding also enables the flowing away of zero phase sequence system currents, thus also enabling the suppression thereof in the AC voltage line.

In accordance with one preferred configuration of the invention, a capacitor module having a grounding terminal and two connecting terminals is provided, wherein a respective capacitor branch is formed between the grounding terminal and each connecting terminal, said capacitor branch comprising one or a plurality of capacitors connected in series with one another, wherein each connecting terminal is connected to a connecting terminal of the phase module branches. The flowing away of zero phase sequence system currents is also made possible via the grounding terminal of the capacitor module. The capacitor module can thus be equipped with a grounding terminal in addition to the phase module described further above, or indeed be provided instead. Both in the case of the grounded phase module and in the case of the capacitor module, a central arrangement of the grounding terminal and hence a symmetrical configuration of the capacitor module is expedient. The phase module branches of a phase module that respectively extend between the connecting terminal and the grounding terminal are therefore identical. The same correspondingly applies to the series circuit comprising capacitors or to the two capacitors which are respectively arranged in a branch between grounding terminal and connecting terminal. On account of this configuration, too, a high degree of symmetry can be provided in the transmission.

BRIEF DESCRIPTION OF THE SEVERAL VIEWS OF THE DRAWING

Further expedient configurations and advantages of the invention are the subject matter of the following description of exemplary embodiments of the invention with reference to the figures of the drawing, wherein identical reference symbols refer to identically acting component parts and wherein.

DESCRIPTION OF THE INVENTION

Figure 1:
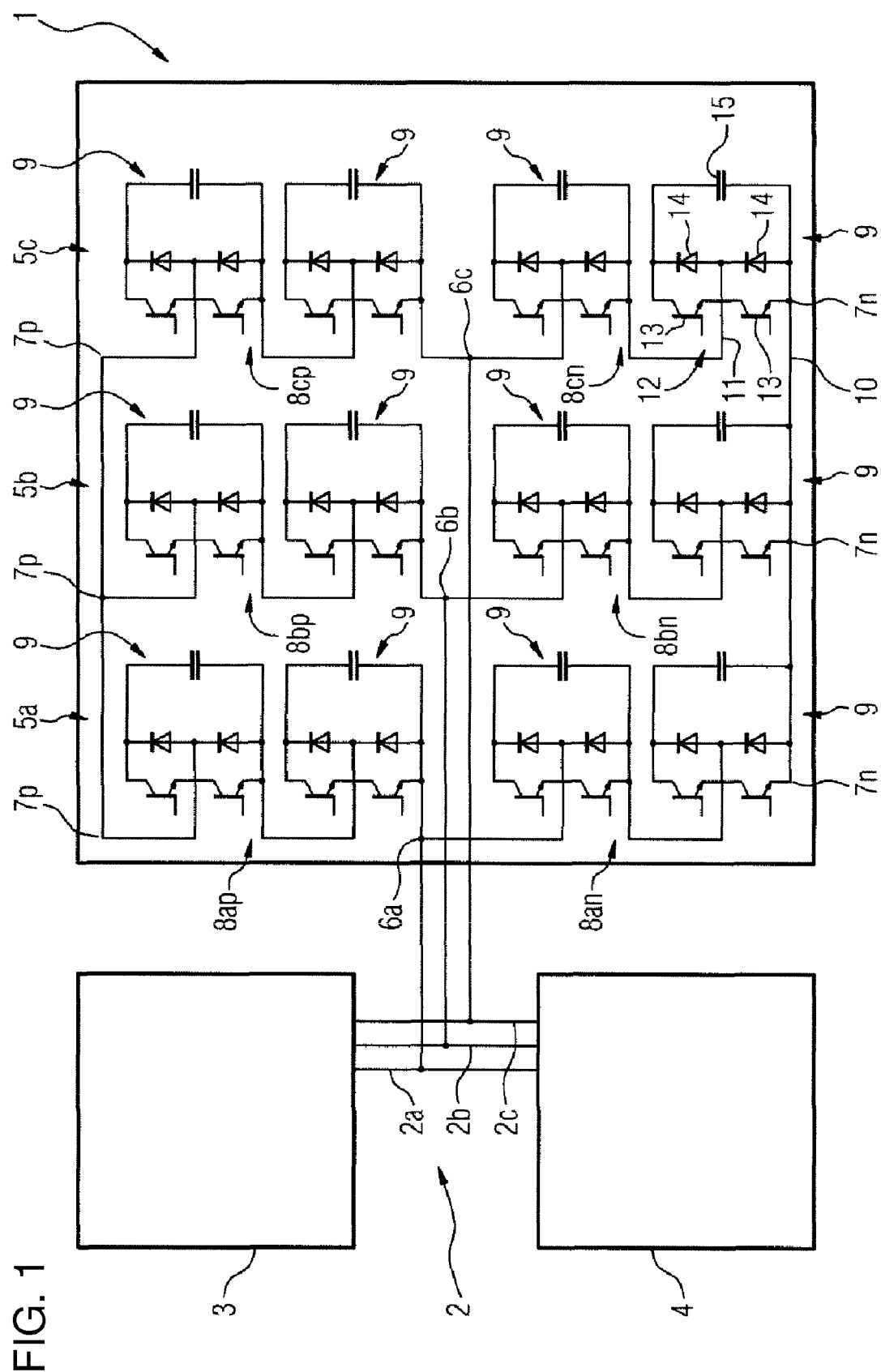
FIG. 1 shows an exemplary embodiment of the device according to the invention in an equivalent circuit illustration.

FIG. 1 shows an exemplary embodiment of the device 1 according to the invention, this device being connected to an AC voltage line 2 with the phases 2a, 2b and 2c. In this case, the AC voltage line 2 extends between a supply system 3 that feeds electrical energy and a load 4 that loads the supply system 3 or the AC voltage line 2 asymmetrically, and at the same time harmonics of the nominal frequency of the AC voltage of the AC voltage line 2 are produced here. The device 1 is provided for compensating for the asymmetries and, in particular, for suppressing said harmonics.

The device 1 illustrated in FIG. 1 comprises three phase modules 5a, 5b and 5c, which each have an AC voltage terminal 6a, 6b and 6c, which are respectively connected to a phase 2a, 2b and 2c of the AC voltage line 2. Furthermore, each phase module 5a, 5b and 5c in each case has two connecting terminals 7p and 7n, wherein a respective phase module branch 8ap, 8bp, 8cp, 8an, 8bn and 8cn extends between each AC voltage terminal 6a, 6b and 6c and each of the connecting terminals 7p and 7n, respectively. Each of these six phase module branches comprises a series circuit formed by submodules 9.

The submodules 9 are configured as two-terminal networks and have a first connection terminal 10 and a second connection terminal 11. Furthermore, each submodule 9 has a power semiconductor branch 12 having two turn-off power semiconductors 13, such as IGBTs, for example, connected in series with one another. Each turn-off power semiconductor 13 has a freewheeling diode 14 connected in parallel with it in the opposite sense. The power semiconductor branch 12 is connected in parallel with a capacitor 15 as energy store. The emitter of the turn-off power semiconductor 13 illustrated at the bottom in FIG. 1 and the anode of the freewheeling diode 14 connected in parallel with said turn-off power semiconductor 13 are at the potential of the first connection terminal 10 of the submodule. The second connection terminal is at the potential of the junction points between the two turn-off power semiconductors 13 and thus at the potential of the junction point between the two freewheeling diodes 14 connected in series.

Depending on the driving of the turn-off power semiconductors 13, either the capacitor voltage or a zero voltage is dropped across the connection terminals 10 and 11. However, this can also be achieved with some other interconnection of the stated components as mentioned further above.

The capacitors 15 of each submodule 9 are charged by means of an expedient driving (not shown in FIG. 1) of the turn-off power semiconductors. However, the control and regulating unit furthermore also comprises a procedure by which harmonics of the alternating current flowing in the AC voltage line are identified. Said harmonics have a frequency that is an integer multiple of the nominal frequency of the voltage in the AC voltage line. Through expedient driving of the turn-off power semiconductors 13, on account of the charged capacitors 9 a voltage is generated which drives a compensation current or filter current, which is coupled into the AC voltage line 2 and ensures that the harmonics and also asymmetries of the current in the AC voltage line 2 are suppressed.

Figure 2:
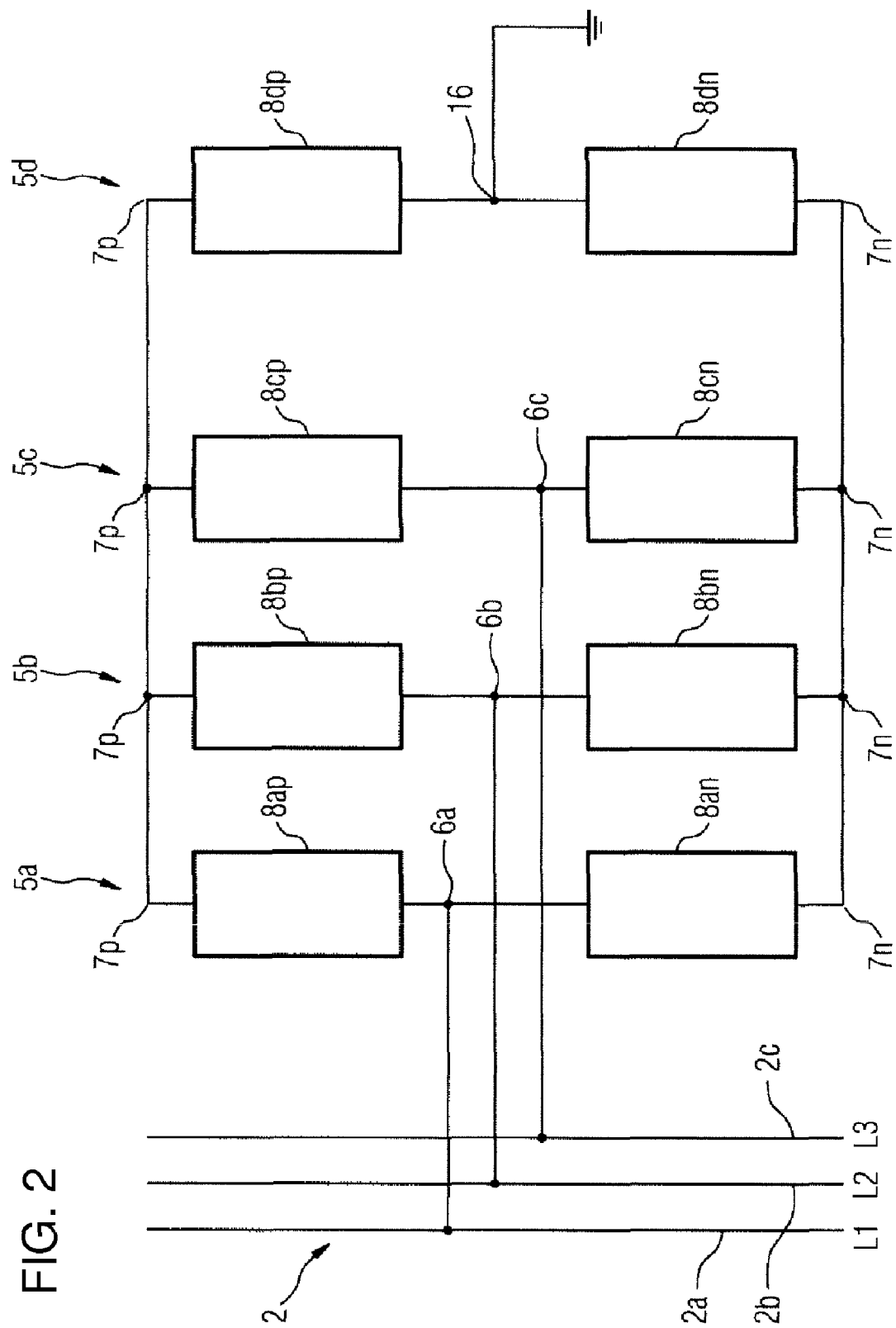
FIG. 2 shows a further exemplary embodiment of the device according to the invention.

FIG. 2 shows a further example of the device 1 according to the invention with the phase modules 5a, 5b and 5c each having two phase module branches 8ap, 8an, 8bp, 8bn, 8cp and 8cn, respectively. In order to allow zero phase sequence system currents to flow away, a further phase module 5d is provided, which again has two connecting terminals 7p and 7n, which are connected to the connecting terminals 7p and 7n, respectively, of the phase modules 5a, 5b and 5c by means of a connecting line. In contrast to the phase modules 5a, 5b and 5c, however, the phase module 5d does not have an AC voltage terminal, but rather a grounding terminal 16, via which zero phase sequence system currents can flow away given expedient driving of the turn-off power semiconductors of the submodules 9 of the phase module branches 8dp and 8dn. Suppression of asymmetries on account of zero phase sequence system currents is thus also made possible in accordance with this advantageous configuration of the invention.

Figure 3:
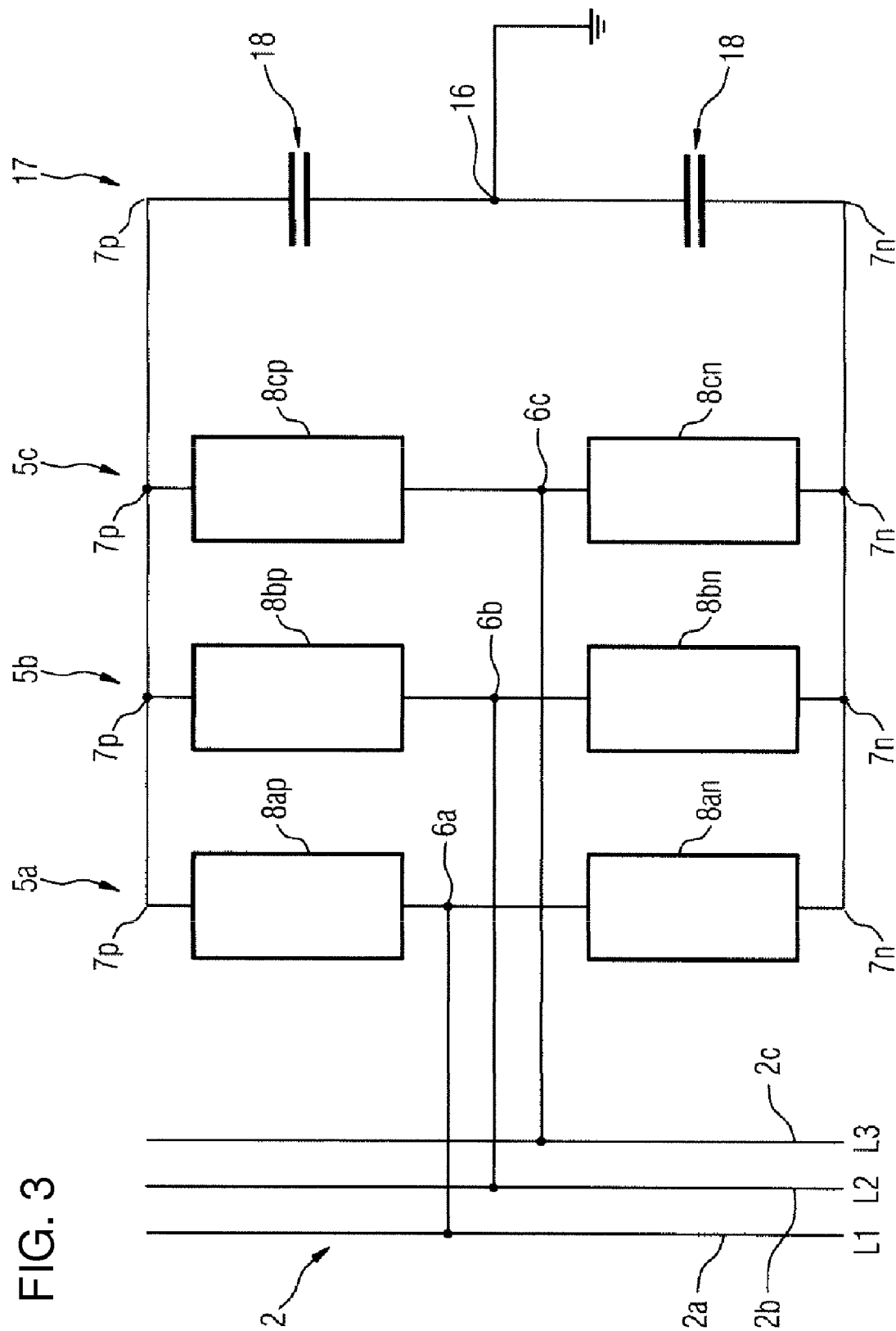
FIG. 3 shows a further exemplary embodiment of the device according to the invention.

FIG. 3 shows a further exemplary embodiment of the invention, wherein, however, the connecting terminals 7p and 7n of the phase modules 5a, 5b and 5c are connected to the connecting terminals 7p and 7n, respectively, of a capacitor module 17. The capacitor module 17 has a grounding terminal 16, wherein a respective capacitor 18 is connected between the grounding terminal 16 and each connecting terminal 7p and 7n, respectively. It goes without saying that a plurality of capacitors 18 connected in series can also be provided between the grounding terminal 16 and each connecting terminal 7p and 7n, respectively, of the capacitor module 17. A flowing away of the zero phase sequence system currents is once again made possible via the grounding terminal 16.

Furthermore, the coupling of a capacitive reactive power into the AC voltage line 2 is made possible by expedient driving of the turn-off power semiconductors of the phase modules 5a, 5b and 5c. Consequently, power factor correction is also provided by this further development of the device 1 according to the invention. It goes without saying that a centrally grounded phase module, which is designated by 5d in FIG. 2, can also be used together with a capacitor module 16 and also the three phase modules 5a, 5b and 5c in the context of the invention, wherein the connecting terminals 7p and 7n, respectively, are put at a common potential by means of a connecting line.

The invention claimed is:

1. A device for influencing an electrical energy transmission of an AC voltage line having a plurality of phases, comprising:
   a plurality of phase modules, each of said plurality of phase modules having an AC voltage terminal for connection to a respective phase of the AC voltage line, each of said plurality of phase modules having a first connecting terminal and a second connecting terminal;
   each of said plurality of phase modules including a first phase module branch extending between the AC voltage terminal and the first connecting terminal;
   each of said plurality of phase modules including a second phase module branch extending between the AC voltage terminal and the second connecting terminal;
   said first phase module branch including a series circuit formed by submodules each having a power semiconductor circuit and an energy storage device connected in parallel with said power semiconductor circuit;
   said second phase module branch including a series circuit formed by submodules each having a power semiconductor circuit and an energy storage device connected in parallel with said power semiconductor circuit of said second phase module branch;
   said first connecting terminals of said plurality of modules being connected together;
   said second connecting terminals of said plurality of modules being connected together;
   said power semiconductor circuit in said first phase module branch including power semiconductors interconnected with one another in a half-bridge; and
   said power semiconductor circuit in said second phase module branch including power semiconductors interconnected with one another in a half-bridge.

2. The device according to claim 1, wherein:
   each of said submodules in said second phase module branch has a first connection terminal and a second connection terminal;
   said power semiconductors in said second phase module branch include a first turn-off power semiconductor, a second turn-off power semiconductor connected in series with said first turn-off power semiconductor, a first free freewheeling diode connected in parallel with said first turn-off power semiconductor and connected in an opposite direction, and a second free freewheeling diode connected in parallel with said second turn-off power semiconductor and connected in an opposite direction; and
   a node connected to an emitter of said first turn-off power semiconductor and an anode of said first freewheeling diode forms said first connection terminal; and
   a node connected to said first free freewheeling diode and said second free freewheeling diode forms said second connection terminal.

3. The device according to claim 1, wherein:
   each of said submodules in said first phase module branch has a first connection terminal and a second connection terminal;
   said power semiconductors in said first phase module branch include a first turn-off power semiconductor, a second turn-off power semiconductor connected in series with said first turn-off power semiconductor, a first free freewheeling diode connected in parallel with said first turn-off power semiconductor and connected in an opposite direction, and a second free freewheeling diode connected in parallel with said second turn-off power semiconductor and connected in an opposite direction; and
   a node connected to a collector of said first said turn-off power semiconductor and a cathode of said first freewheeling diode forms said first connection terminal; and
   a node connected to said first free freewheeling diode and said second free freewheeling diode forms said second connection terminal.

4. The device according to claim 1, which comprises a further phase module having a grounding terminal connected to ground potential and two connecting terminals, said further phase module having phase module branches respectively extending between each connecting terminal and said grounding terminal, said phase module branches each containing a series circuit formed by submodules with each connecting terminal being connected to said connecting terminal of the remaining said phase modules.

5. The device according to claim 1, which comprises a capacitor module having a grounding terminal and two connecting terminals, said capacitor module having two capacitor branches each extending between said grounding terminal and a respective said connecting terminal, said capacitor branch containing one or a plurality of capacitors connected in series with one another, and wherein each connecting terminal is connected to a connecting terminal of said phase module branches.

* * * * *